(12) United States Patent
Sameshima et al.

(10) Patent No.: US 12,115,732 B2
(45) Date of Patent: Oct. 15, 2024

(54) THREE-DIMENSIONAL SHAPING NOZZLE WITH SCRATCH-FORMING TARGET MEMBER

(71) Applicant: SEIKO EPSON CORPORATION, Tokyo (JP)

(72) Inventors: Takafumi Sameshima, Nagano (JP); Keitaro Hashizume, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 18/155,818

(22) Filed: Jan. 18, 2023

(65) Prior Publication Data

US 2023/0226770 A1    Jul. 20, 2023

(30) Foreign Application Priority Data

Jan. 20, 2022    (JP) .................................. 2022-006960

(51) Int. Cl.
*B29C 64/393* (2017.01)
*B29C 64/171* (2017.01)
*B29C 64/20* (2017.01)
*B29C 64/209* (2017.01)
*B29C 64/245* (2017.01)
(Continued)

(52) U.S. Cl.
CPC .......... *B29C 64/393* (2017.08); *B29C 64/171* (2017.08); *B29C 64/20* (2017.08); *B29C 64/209* (2017.08); *B29C 64/245* (2017.08); *B29C 64/295* (2017.08); *B33Y 50/02* (2014.12); *B33Y 30/00* (2014.12)

(58) Field of Classification Search
CPC ..... B29C 64/393; B29C 64/171; B29C 64/20; B29C 64/209; B29C 64/245; B29C 64/295; B29C 48/02; B29C 48/266; B29C 64/118; B29C 64/112; B33Y 50/02; B33Y 30/00; B33Y 10/00
See application file for complete search history.

(56) References Cited

U.S. PATENT DOCUMENTS

2005/0288813 A1* 12/2005 Yang ..................... B29C 64/106
                                                                  700/119
2010/0100222 A1*  4/2010 Skubic .................. B29C 64/245
                                                                  700/110
(Continued)

FOREIGN PATENT DOCUMENTS

JP           2021-000812 A    1/2021

*Primary Examiner* — Jeffrey M Wollschlager
*Assistant Examiner* — Guy F Mongelli
(74) *Attorney, Agent, or Firm* — Global IP Counselors, LLP

(57) ABSTRACT

A three-dimensional shaping device includes: a dispensing unit including a nozzle; a stage having a shaping surface on which a shaping material is to be laminated; a position changing unit configured to change a relative position between the nozzle and the stage; a control unit configured to control the position changing unit; and a measurement module used to measure a difference of the nozzle from a reference position in the shaping surface based on a first position of the nozzle in the shaping surface and a second position of the nozzle in the shaping surface. The first position is a position in which the nozzle is assumed to be positioned by the control unit controlling the position changing unit. The second position is a position changed by the control unit controlling the position changing unit.

9 Claims, 10 Drawing Sheets

(51) Int. Cl.
*B29C 64/295* (2017.01)
*B33Y 30/00* (2015.01)
*B33Y 50/02* (2015.01)

(56) References Cited

U.S. PATENT DOCUMENTS

| | | | | |
|---|---|---|---|---|
| 2010/0119996 | A1* | 5/2010 | Kaigler, Sr. | A61C 13/0013 433/215 |
| 2013/0261783 | A1* | 10/2013 | Daon | A61B 90/39 700/118 |
| 2017/0232674 | A1* | 8/2017 | Mark | B29C 31/042 264/308 |
| 2020/0269491 | A1* | 8/2020 | Fujimori | B29C 64/393 |
| 2020/0282659 | A1* | 9/2020 | Lan | B29C 64/245 |
| 2020/0406547 | A1* | 12/2020 | Yuwaki | B22F 12/53 |
| 2020/0406548 | A1* | 12/2020 | Yuwaki | B29C 64/106 |
| 2022/0143743 | A1* | 5/2022 | Riemann | B23K 26/342 |
| 2022/0193996 | A1* | 6/2022 | Durand | B29C 64/393 |

\* cited by examiner

THREE-DIMENSIONAL SHAPING NOZZLE WITH SCRATCH-FORMING TARGET MEMBER

The present application is based on, and claims priority from JP Application Serial Number 2022-006960, filed Jan. 20, 2022, the disclosure of which is hereby incorporated by reference herein in its entirety.

BACKGROUND

1. Technical Field

The present disclosure relates to a three-dimensional shaping device and a calibration method of a three-dimensional shaping nozzle.

2. Related Art

Regarding a three-dimensional shaping device, JP-A-2021-812 (Reference 1) discloses measuring a distance between a tip surface of a nozzle and a shaping surface of a stage on which a three-dimensional shaped object is to be shaped, and adjusting the distance to a predetermined distance.

In Reference 1, shaping accuracy of the three-dimensional shaped object can be improved by adjusting a height of the nozzle with respect to the stage. However, for example, when an origin position of the nozzle in the shaping surface of the stage is deviated, it is not possible to accurately laminate a material on a target region on the stage. Therefore, a technique capable of measuring positional deviation of a nozzle in a shaping surface of a stage is desired.

SUMMARY

According to a first aspect of the present disclosure, a three-dimensional shaping device is provided. The three-dimensional shaping device includes: a dispensing unit including a nozzle; a stage having a shaping surface on which a shaping material is to be laminated; a position changing unit configured to change a relative position between the nozzle and the stage; a control unit configured to control the position changing unit; and a measurement module used to measure a difference of the nozzle from a reference position in the shaping surface based on a first position of the nozzle in the shaping surface and a second position of the nozzle in the shaping surface. The first position is a position in which the nozzle is assumed to be positioned by the control unit controlling the position changing unit. The second position is a position changed by the control unit controlling the position changing unit.

According to a second aspect of the present disclosure, a calibration method of a three-dimensional shaping nozzle provided in a three-dimensional shaping device is provided. The three-dimensional shaping device includes a dispensing unit including a nozzle, a stage having a shaping surface on which a shaping material is to be laminated, a position changing unit configured to change a relative position between the nozzle and the stage, and a control unit configured to control the position changing unit. The calibration method includes: measuring a difference of the nozzle from a reference position in the shaping surface based on a first position of the nozzle in the shaping surface and a second position of the nozzle in the shaping surface. The first position is a position in which the nozzle is assumed to be positioned by the control unit controlling the position changing unit. The second position is a position changed by the control unit controlling the position changing unit.

DESCRIPTION OF EXEMPLARY EMBODIMENTS

A. First Embodiment

Figure 1:
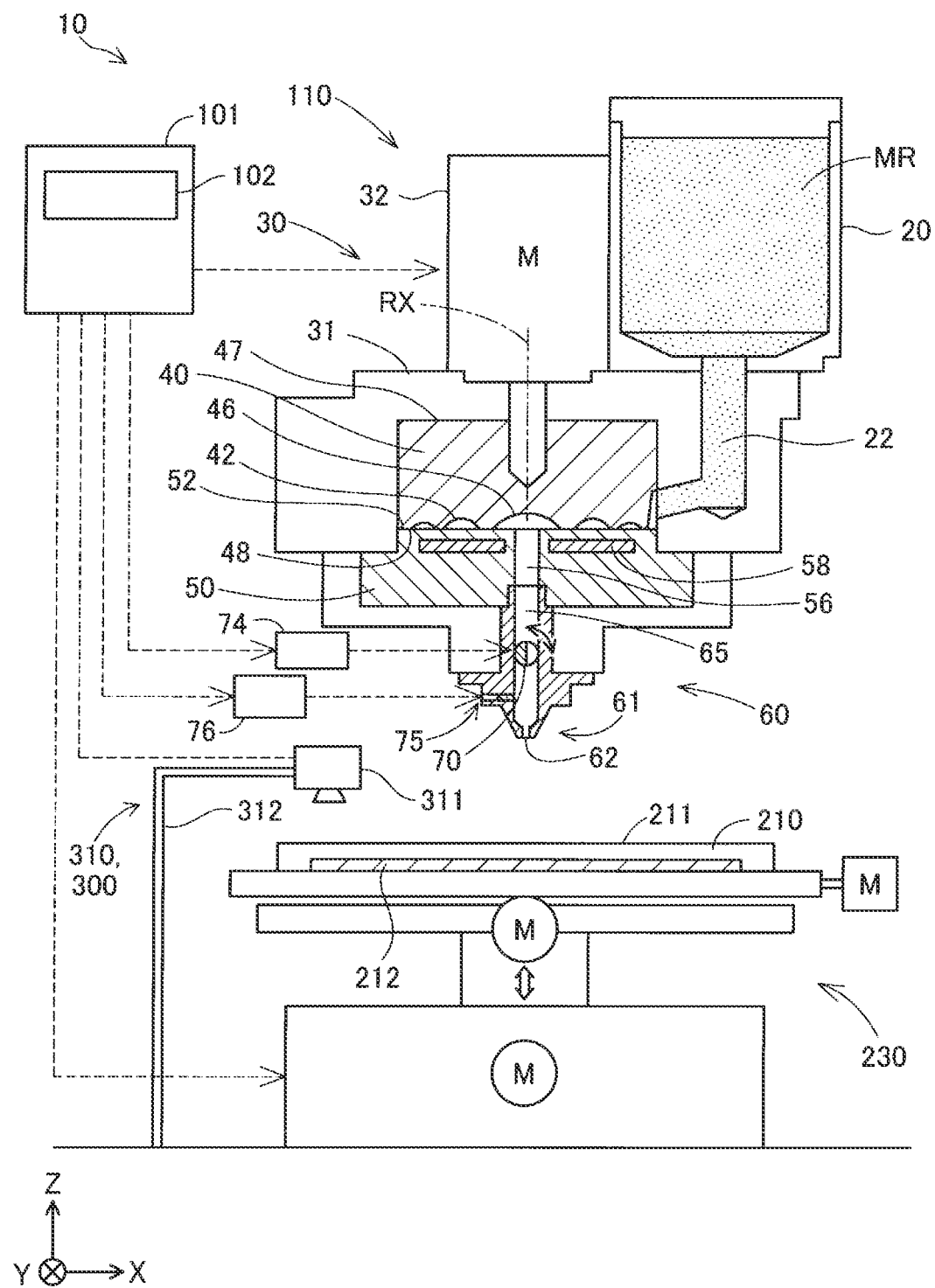
FIG. 1 is an explanatory diagram showing a schematic configuration of a three-dimensional shaping device according to a first embodiment.

FIG. 1 is an explanatory diagram showing a schematic configuration of a three-dimensional shaping device 10 according to a first embodiment. FIG. 1 shows arrows indicating X, Y, and Z directions orthogonal to one another. The X direction and the Y direction are directions parallel to a horizontal plane. The Z direction is a vertically upward direction. The arrows indicating the X, Y, and Z directions are also shown in other drawings as appropriate so that the directions shown in the drawings correspond to those in FIG. 1. In the following description, when a direction is to be specified, a positive or negative sign is used in combination with a direction notation, where a direction indicated by an arrow in each drawing is referred to as "+", a direction opposite thereto is referred to as "−". Hereinafter, a +Z direction is also referred to as "upper". A −Z direction is also referred to as "lower".

The three-dimensional shaping device 10 includes a shaping unit 110 that generates and dispenses a shaping material, a stage 210 having a shaping surface 211 on which the shaping material is to be laminated, a position changing unit 230 that changes a relative position between a nozzle 61 and the stage 210, a control unit 101 that controls the position changing unit 230, and a detection unit 310 that constitutes a part of a measurement module 300.

Under the control of the control unit 101, the shaping unit 110 dispenses a paste-like shaping material obtained by melting a material in a solid state onto the stage 210. Here, "melting" is a concept including plasticization, and means not only that the material is heated to a temperature equal to or higher than a melting point to exhibit fluidity, but also that in the case of a material having a glass transition point, the material is heated to a temperature equal to or higher than the glass transition point to soften and exhibit fluidity. The shaping unit 110 includes a material supply unit 20 that is a supply source of the material before being converted into the shaping material, a shaping material generation unit 30 that converts the material into the shaping material, and a dispensing unit 60 that dispenses the shaping material.

The material supply unit 20 supplies a raw material MR for generating the shaping material to the shaping material generation unit 30. The material supply unit 20 is implemented with, for example, a hopper that accommodates the raw materials MR. The material supply unit 20 has a discharge port on a lower side. The discharge port is coupled to the shaping material generation unit 30 via a communication path 22. The raw material MR is put into the material supply unit 20 in a form of pellets, powder, or the like. In the present embodiment, a pellet-shaped ABS resin material is used.

The shaping material generation unit 30 melts the raw material MR supplied from the material supply unit 20 to generate a paste-like shaping material exhibiting fluidity, and guides the shaping material to the dispensing unit 60. The shaping material generation unit 30 includes a screw case 31, a drive motor 32, a flat screw 40, and a screw-facing portion 50. The flat screw 40 is also referred to as a rotor or a scroll. The screw-facing portion 50 is also referred to as a barrel.

Figure 2:
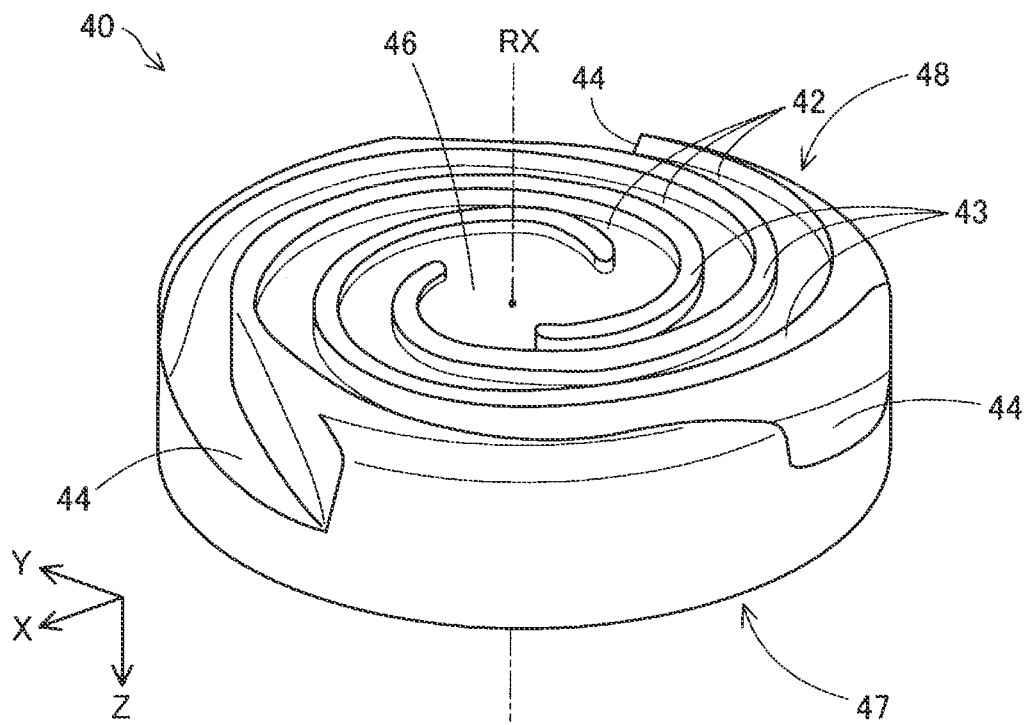
FIG. 2 is a perspective view showing a schematic configuration of a flat screw.
Figure 3:
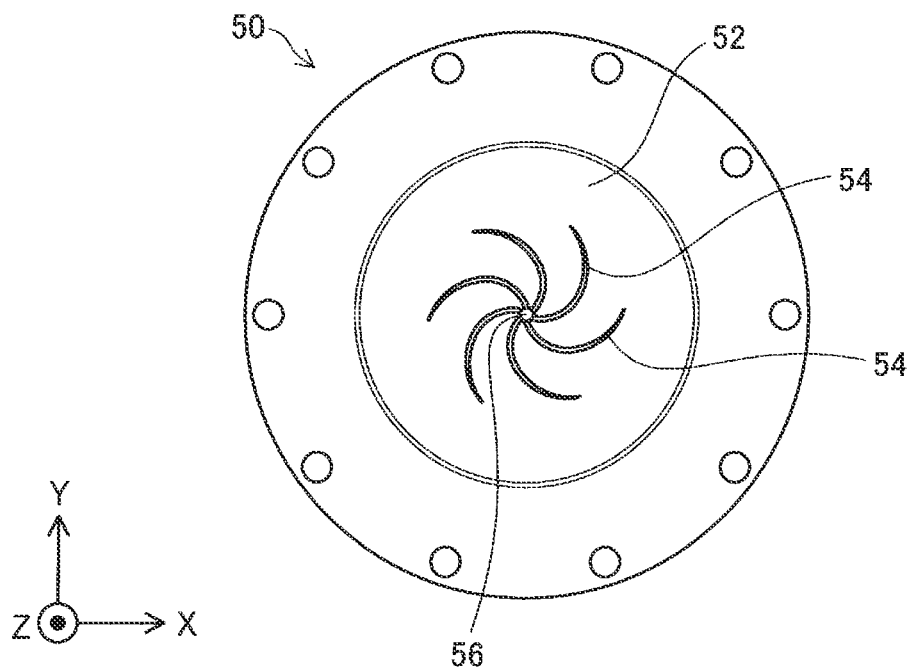
FIG. 3 is a schematic plan view showing a screw-facing portion.

FIG. 2 is a perspective view showing a schematic configuration of a lower surface 48 side of the flat screw 40. In order to facilitate understanding of the technique, the flat screw 40 shown in FIG. 2 is shown in a state in which a positional relationship between an upper surface 47 and a lower surface 48 shown in FIG. 1 is reversed in a vertical direction. FIG. 3 is a schematic plan view showing an upper surface 52 side of the screw-facing portion 50. The flat screw 40 has a substantially cylindrical shape whose height in an axial direction, which is a direction along a central axis of the flat screw 40, is smaller than a diameter of the flat screw 40. The flat screw 40 is disposed such that a rotation axis RX serving as a rotation center of the flat screw 40 is parallel to the Z direction.

The flat screw 40 is housed in the screw case 31. An upper surface 47 side of the flat screw 40 is coupled to the drive motor 32. The flat screw 40 is rotated in the screw case 31 by a rotational drive force generated by the drive motor 32. The drive motor 32 is driven under the control of the control unit 101. The flat screw 40 may be driven by the drive motor 32 via a speed reducer.

Spiral groove portions 42 are formed on the lower surface 48 of the flat screw 40 which is a surface intersecting with the rotation axis RX. The communication path 22 of the material supply unit 20 described above communicates with the groove portions 42 from a side surface of the flat screw 40. As shown in FIG. 2, in the present embodiment, three groove portions 42 are formed so as to be separated from one another by ridge portions 43. The number of the groove portions 42 is not limited to three, and may be one or two or more. A shape of the groove portion 42 is not limited to a spiral shape, and may be a helical shape or an involute curve shape, or may be a shape extending so as to draw an arc from a central portion toward an outer periphery.

The lower surface 48 of the flat screw 40 faces an upper surface 52 of the screw-facing portion 50. A space is formed between the groove portions 42 on the lower surface 48 of the flat screw 40 and the upper surface 52 of the screw-facing portion 50. In the shaping unit 110, the raw material MR is supplied from the material supply unit 20 to material inlet ports 44 shown in FIG. 2 into the space between the flat screw 40 and the screw-facing portion 50.

A heater 58 for heating the raw material MR supplied into the groove portions 42 of the rotating flat screw 40 is embedded in the screw-facing portion 50. A plurality of guide grooves 54 coupled to a communication hole 56 and extending in a spiral shape from the communication hole 56 toward the outer periphery are formed in the screw-facing portion 50. One end of each guide groove 54 may not be coupled to the communication hole 56. The guide grooves 54 may be omitted.

The raw material MR supplied into the groove portions 42 of the flat screw 40 flow along the groove portions 42 by the rotation of the flat screw 40 while being melted in the groove portions 42, and is guided to a central portion 46 of the flat screw 40 as the shaping material. The paste-like shaping material that flows into the central portion 46 and exhibits fluidity is supplied to the dispensing unit 60 via the communication hole 56 provided at the center of the screw-facing portion 50 shown in FIG. 3. In the shaping material, not all types of substances constituting the shaping material need to be melted. The shaping material may be converted into a state having fluidity as a whole by melting at least a part of types of substances among all the types of substances constituting the shaping material.

The dispensing unit 60 includes the nozzle 61 for three-dimensional shaping that dispenses the shaping material, a flow path 65 for the shaping material provided between the flat screw 40 and the nozzle 61, a flow rate adjustment unit 70 that opens and closes the flow path 65, and an absorption unit 75 that absorbs and temporarily stores the shaping material. The nozzle 61 is coupled to the communication hole 56 of the screw-facing portion 50 through the flow path 65. The nozzle 61 dispenses the shaping material generated by the shaping material generation unit 30 from a dispensing port 62 at a tip toward the stage 210. A heater that prevents a decrease in a temperature of the shaping material dispensed onto the stage 210 may be disposed around the nozzle 61.

The flow rate adjustment unit 70 changes an opening degree of the flow path 65 by rotating in the flow path 65. In the present embodiment, the flow rate adjustment unit 70 includes a butterfly valve. The flow rate adjustment unit 70 is driven by a first drive unit 74 under the control of the control unit 101. The first drive unit 74 includes, for example, a stepping motor. The control unit 101 can control a rotation angle of the butterfly valve using the first drive unit 74, thereby controlling a flow rate of the shaping material flowing from the shaping material generation unit 30 to the nozzle 61, that is, a flow rate of the shaping material dispensed from the nozzle 61. The flow rate adjustment unit 70 adjusts the flow rate of the shaping material and controls ON/OFF of an outflow of the shaping material.

The absorption unit 75 is coupled between the flow rate adjustment unit 70 and the dispensing port 62 in the flow path 65. The absorption unit 75 temporarily absorbs the shaping material in the flow path 65 when the dispensing of the shaping material from the nozzle 61 is stopped, thereby preventing an elongating phenomenon in which the shaping material drips like pulling a thread from the dispensing port 62. In the present embodiment, the absorption unit 75 includes a plunger. The absorption unit 75 is driven by a second drive unit 76 under the control of the control unit 101. The second drive unit 76 includes, for example, a stepping motor, and a rack and pinion mechanism that converts a rotational force of the stepping motor into a translational motion of a plunger.

For example, when stopping the dispensing of the shaping material from the nozzle 61, the control unit 101 first controls the flow rate adjustment unit 70 to turn off the outflow of the shaping material, and then controls the absorption unit 75 to absorb the shaping material. When restarting the dispensing of the shaping material from the nozzle 61, the material absorbed by the absorption unit 75 is sent out by controlling the absorption unit 75, and then the flow rate adjustment unit 70 is controlled to turn on the outflow of the shaping material. As described above, the control unit 101 controls the flow rate adjustment unit 70 and the absorption unit 75. Therefore, it is possible to improve dispensing response of the shaping material.

The stage 210 is disposed at a position facing the dispensing port 62 of the nozzle 61. In the first embodiment, the shaping surface 211 of the stage 210 facing the dispensing port 62 of the nozzle 61 is disposed parallel to the X and Y directions, that is, a horizontal direction. At the time of three-dimensional shaping, the three-dimensional shaping device 10 shapes a three-dimensional shaped object by dispensing the shaping material from the dispensing unit 60 toward the shaping surface 211 of the stage 210 and laminating layers. The stage 210 is provided with a stage heater 212 as a heating unit. The stage heater 212 prevents a rapid decrease in the temperature of the shaping material dispensed onto the stage 210.

The position changing unit 230 changes a relative position between the nozzle 61 and the stage 210. In the present embodiment, a position of the nozzle 61 is fixed. The position changing unit 230 moves the stage 210. The position changing unit 230 includes a three-axis positioner that moves the stage 210 in three axis directions including the X, Y, and Z directions by driving forces of three motors. The position changing unit 230 changes a relative positional relationship between the nozzle 61 and the stage 210 under the control of the control unit 101. In the present specification, unless otherwise specified, a movement of the nozzle 61 means that the nozzle 61 is moved with respect to the stage 210.

In another embodiment, instead of the configuration in which the position changing unit 230 moves the stage 210, a configuration in which the position changing unit 230 moves the nozzle 61 with respect to the stage 210 in a state in which the position of the stage 210 is fixed may be adopted. A configuration in which the stage 210 is moved in the Z direction by the position changing unit 230 and the nozzle 61 is moved in the X and Y directions, or a configuration in which the stage 210 is moved in the X and Y directions by the position changing unit 230 and the nozzle 61 is moved in the Z direction may be adopted. With these configurations, the relative positional relationship between the nozzle 61 and the stage 210 can be changed.

The detection unit 310 includes a camera 311 that captures an image of the shaping surface 211 of the stage 210, and an arm unit 312 that movably supports the camera 311. The detection unit 310 is controlled by the control unit 101. In response to an instruction from the control unit 101, the detection unit 310 drives the arm unit 312 to move the camera 311 to a position facing the stage 210. Then, the detection unit 310 captures an image of a designated region on the stage 210 using the camera 311. The captured image is transmitted to the control unit 101.

The control unit 101 is a control device that controls an overall operation of the three-dimensional shaping device 10. The control unit 101 includes a computer including one or a plurality of processors, a storage device, and an input and output interface that receives and outputs signals from and to the outside. The control unit 101 functions as a shaping unit 102 when the processor executes a program or a command read into the storage device. The control unit 101 may be implemented by a combination of a plurality of circuits.

The shaping unit 102 controls the shaping unit 110 and the position changing unit 230 to shape the three-dimensional shaped object based on shaping data for shaping the three-dimensional shaped object.

The shaping unit 102 generates layer data obtained by slicing a shape of the three-dimensional shaped object into a plurality of layers, based on three-dimensional CAD data representing the shape of the three-dimensional shaped object or the like. Then, shaping data is generated for each layer included in the layer data. The shaping data includes path information indicating a movement path of the dispensing unit 60 and dispensing amount information indicating a dispensing amount of the shaping material in each movement path. The movement path of the dispensing unit 60 is a path in which the nozzle 61 relatively moves along the shaping surface 211 of the stage 210 while dispensing the shaping material.

The path information includes a plurality of partial paths. Each partial path is a linear path represented by a start point and an end point. The dispensing amount information is individually associated with each partial path. In the present embodiment, the dispensing amount represented by the dispensing amount information is an amount of the shaping material dispensed per unit time in the corresponding partial path. In another embodiment, a total amount of the shaping material dispensed in the entire partial path may be associated with each partial path as the dispensing amount information.

Figure 4:
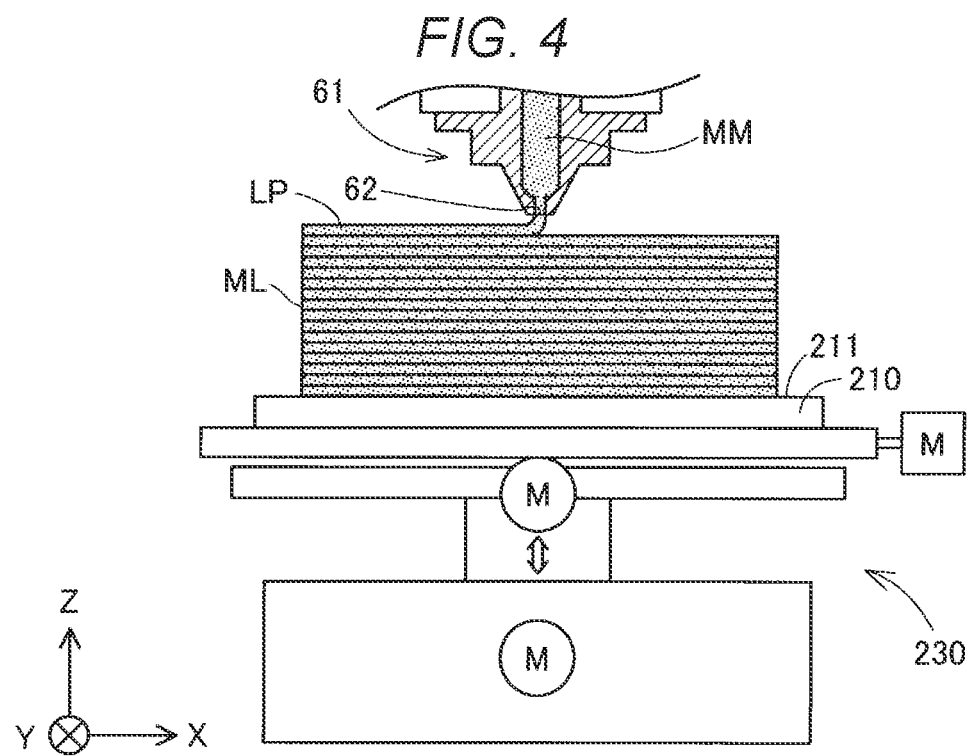
FIG. 4 is an explanatory diagram schematically showing a state in which a three-dimensional shaped object is being shaped.

FIG. 4 is an explanatory diagram schematically showing a state in which a three-dimensional shaped object is being shaped in the three-dimensional shaping device 10. In the three-dimensional shaping device 10, as described above, in the shaping material generation unit 30, the solid raw material MR supplied to the groove portions 42 of the rotating flat screw 40 is melted to generate a shaping material MM. The control unit 101 causes the nozzle 61 to dispense the shaping material MM while changing the position of the nozzle 61 with respect to the stage 210 in a direction along the shaping surface 211 of the stage 210 while maintaining a distance between the shaping surface 211 of the stage 210 and the nozzle 61. The shaping material MM dispensed from the nozzle 61 is continuously deposited in a moving direction of the nozzle 61. By scanning by the nozzle 61, a linear portion LP, which is a shaped portion linearly extending along a scanning path of the nozzle 61, is shaped. When the three-dimensional shaped object is being shaped, the control unit 101 controls the stage heater 212 to increase a temperature of the stage 210 to a predetermined temperature.

The control unit 101 repeats the scanning by the nozzle 61 to form layers ML. After forming one layer ML, the control unit 101 moves the position of the nozzle 61 with respect to the stage 210 in the Z direction. Then, the three-dimensional shaped object is shaped by further laminating a layer ML on the layers ML formed so far.

For example, the control unit 101 may temporarily interrupt the dispensing of the shaping material from the nozzle 61 when the nozzle 61 moves in the Z direction after one layer ML is completely formed or when each layer includes a plurality of independent shaping regions. In this case, the flow path 65 is closed by the flow rate adjustment unit 70, and the dispensing of the shaping material MM from the dispensing port 62 is stopped. After changing the position of the nozzle 61, the control unit 101 causes the flow rate adjustment unit 70 to open the flow path 65 to restart the deposition of the shaping material MM from a changed position of the nozzle 61.

Figure 5:
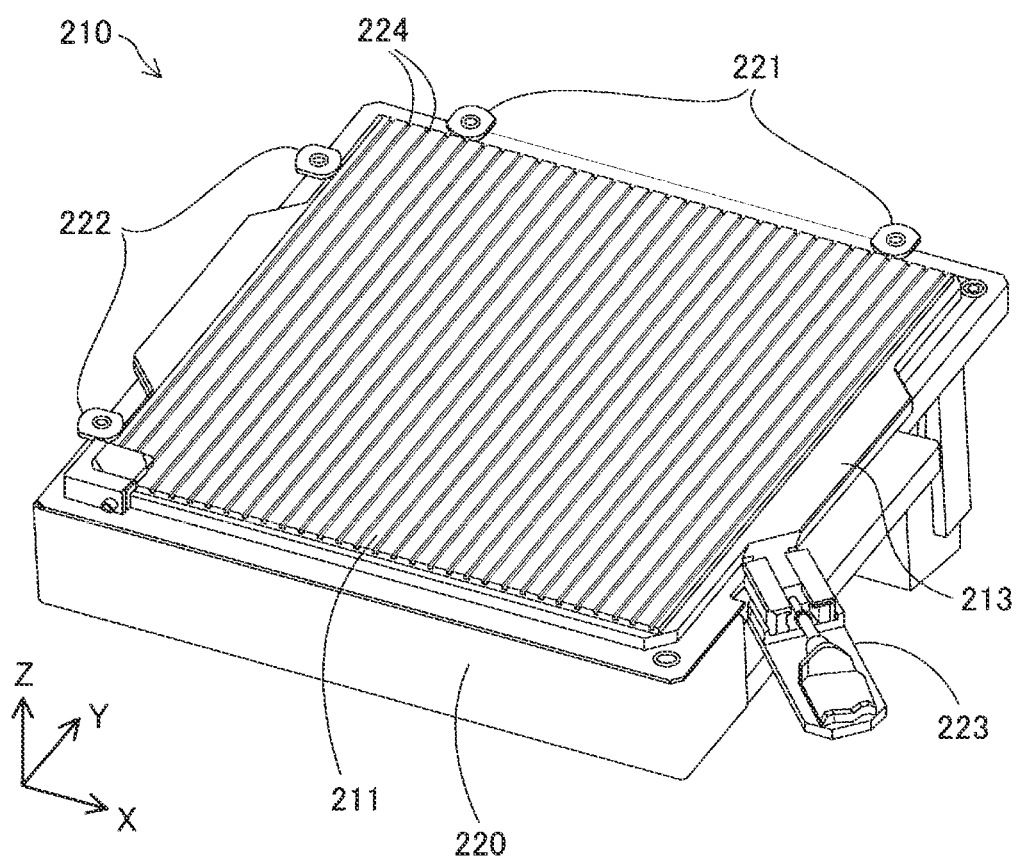
FIG. 5 is a perspective view showing a specific configuration of a stage.

FIG. 5 is a perspective view showing a specific configuration of the stage 210. The stage 210 has a substantially rectangular shape when viewed in the −Z direction, and is placed on a support table 220. The stage heater 212 shown in FIG. 1 is disposed between the stage 210 and the support table 220.

In the shaping surface 211 of the stage 210 in the present embodiment, linear grooves 224 formed along the Y direction are formed at equal intervals in the X direction. The grooves 224 are provided to generate an anchor effect on the shaping material dispensed to the shaping surface 211. In another embodiment, these grooves 224 may not be provided.

A trapezoidal convex portion 213 protruding in the +X direction is provided at an end portion of the stage 210 in the +X direction. The support table 220 is provided with first stoppers 221 for positioning an edge of the stage 210 in a +Y direction and second stoppers 222 for positioning an edge of the stage 210 in a −X direction. Further, the support table 220 is provided with a biasing portion 223 provided with a spring for pressing the convex portion 213 provided on the stage 210 in the −X direction and the +Y direction. The stage 210 is positioned and fixed on the support table 220 by the first stoppers 221, the second stoppers 222, and the biasing portion 223 provided on the support table 220.

Figure 6:
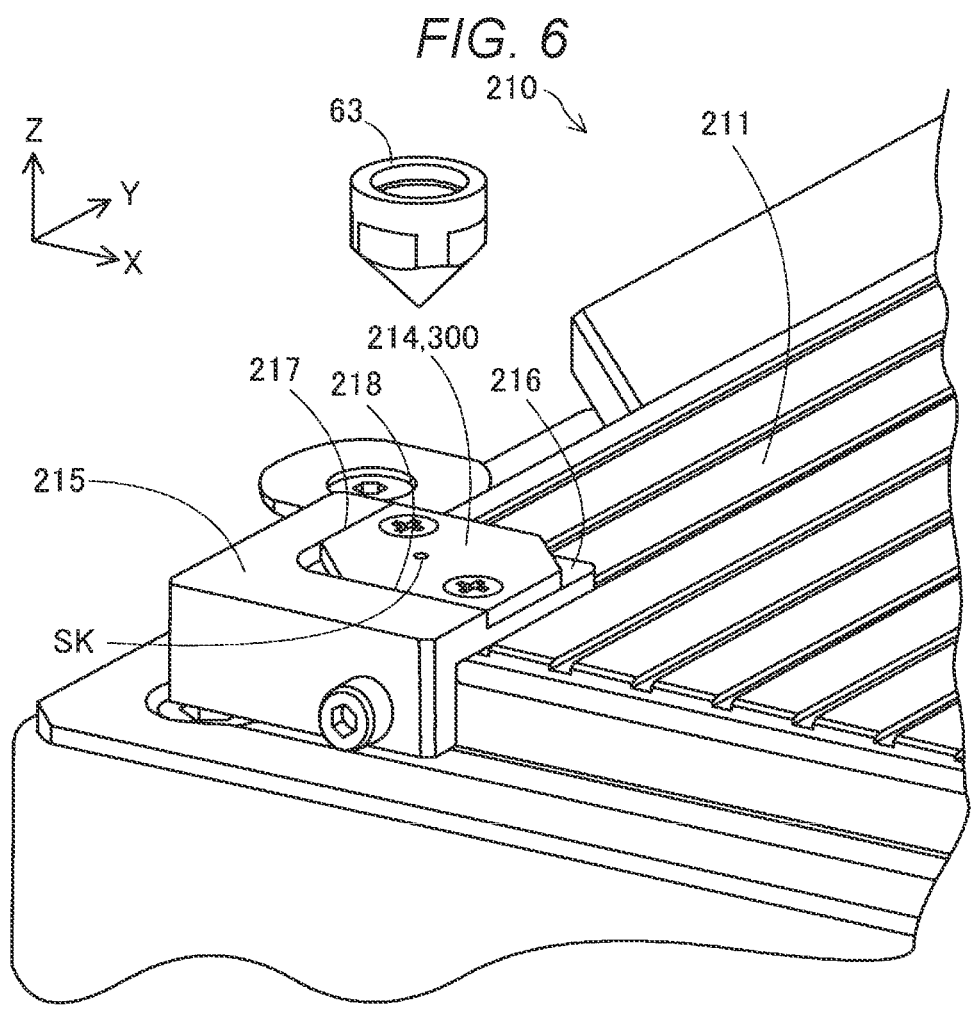
FIG. 6 is an enlarged perspective view of a part of the stage.
Figure 7:
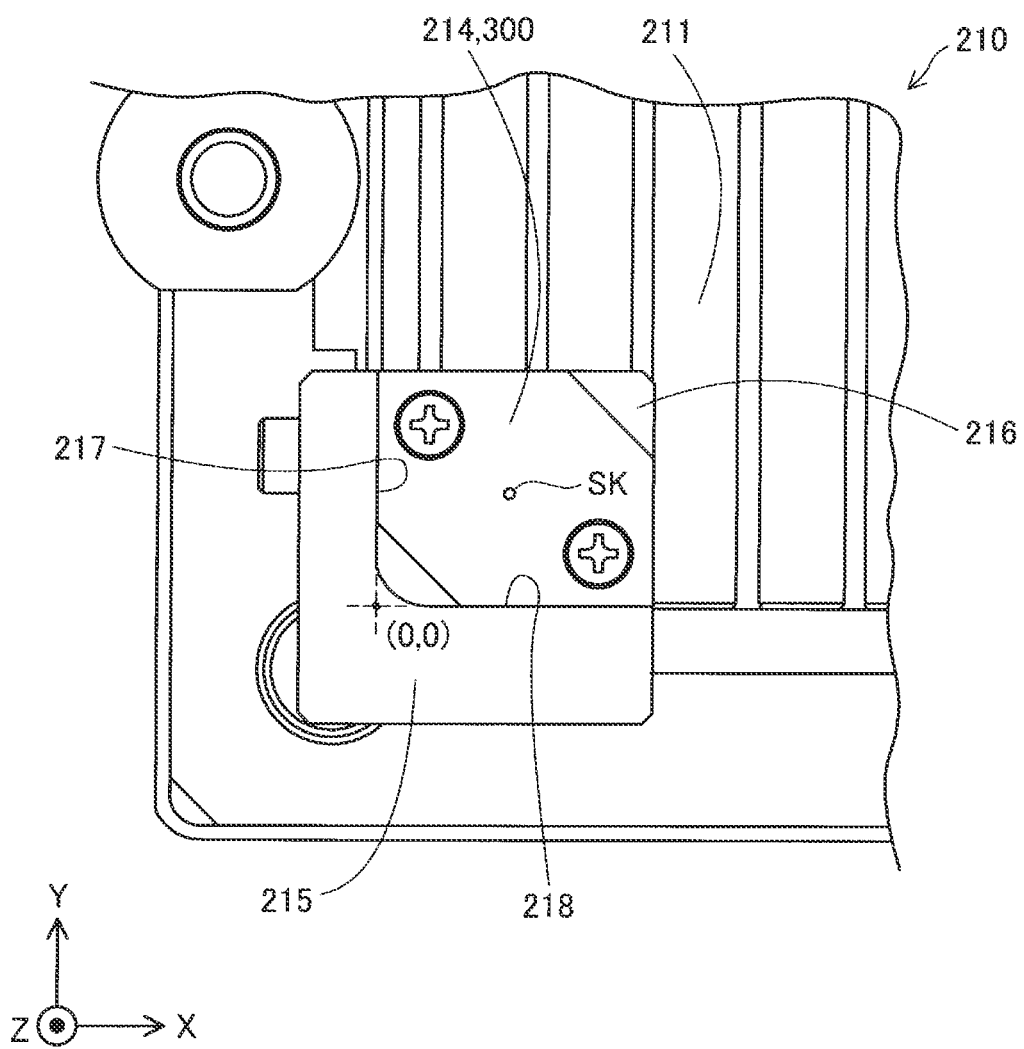
FIG. 7 is a plan view of FIG. 6.

FIG. 6 is an enlarged perspective view of a part of the stage 210. FIG. 7 is a plan view of FIG. 6. A plate-shaped scratch-forming target member 214 is disposed at a corner portion of the stage 210 in the −X direction and a −Y direction. The scratch-forming target member 214 constitutes the measurement module 300 together with the detection unit 310 shown in FIG. 1. The scratch-forming target member 214 is detachably fixed to a support block 215 for fixing the scratch-forming target member 214 to the stage 210. The support block 215 is detachably fixed to the stage 210 at the corner portion of the stage 210 in the −X direction and the −Y direction. With such a structure, the scratch-forming target member 214 is installed at a predetermined position on the stage 210.

A concave portion 216 in which the scratch-forming target member 214 is accommodated is formed on an upper surface of the support block 215. When viewed in the −Z direction, an edge 217 of the concave portion 216 in the −X direction coincides with the edge of the shaping surface 211 in the −X direction. When viewed in the −Z direction, an edge 218 of the concave portion 216 in the −Y direction coincides with the edge of the shaping surface 211 in the −Y direction. As shown in FIG. 7, an intersection point obtained by extending the edge 217 in the −X direction and the edge 218 in the −Y direction of the concave portion 216 coincides with an origin (0, 0) which is a reference position of the shaping surface 211.

The scratch-forming target member 214 is a member on which a scratch is to be formed by a scratch-forming nozzle 63 shown in FIG. 6. No dispensing port is formed in the scratch-forming nozzle 63. A portion corresponding to the dispensing port has a shape pointed toward the −Z direction. That is, the scratch-forming nozzle 63 is a member imitating the nozzle 61, and is a member that is not used for dispensing the shaping material. The scratch-forming nozzle 63 is attached to the dispensing unit 60 so as to cover the nozzle 61. Specifically, the screw forming nozzle 63 can be detachably attached to the dispensing unit 60 by screwing a screw groove formed on an inner surface of the scratch-forming nozzle 63 to a screw thread formed around the nozzle 61. With such a configuration, the position of the nozzle 61 and the position of the scratch-forming nozzle 63 in the shaping surface 211 coincide with each other. In another embodiment, the nozzle 61 and the scratch-forming nozzle 63 may be replaceably attached to the dispensing unit 60.

A hardness of the scratch-forming nozzle 63 is higher than a hardness of the scratch-forming target member 214. In the present embodiment, the hardness refers to Vickers hardness. The scratch-forming nozzle 63 is formed of, for example, carbon steel for machine structural use or steel carbon chromium bearing steel. On the other hand, the scratch-forming target member 214 is formed of, for example, aluminum. Therefore, when the control unit 101 controls the position changing unit 230 to relatively move the dispensing unit 60 attached with the scratch-forming nozzle 63 in the −Z direction and press the dispensing unit 60 against the scratch-forming target member 214, a dot-shaped scratch SK is formed on the scratch-forming target member 214 by the pointed tip of the scratch-forming nozzle 63.

The control unit 101 captures an image of the scratch SK together with the support block 215 by the camera 311 provided in the detection unit 310, and measures, by image analysis, a distance from the edge of the concave portion 216 in the −X direction formed in the support block 215 to the scratch SK and a distance from the edge of the concave portion 216 in the −Y direction to the scratch SK. In this way, a position of the scratch SK with respect to the origin of the shaping surface 211, that is, the position of the nozzle 61 with respect to the origin of the shaping surface 211 can be measured.

Figure 8:
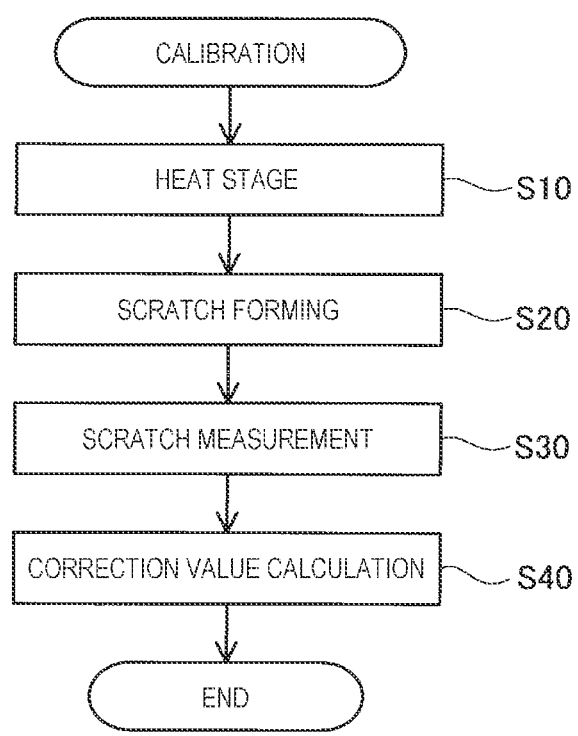
FIG. 8 is a flowchart of calibration.

FIG. 8 is a flowchart of calibration executed by the control unit 101. The calibration is executed at a predetermined timing, for example, before shipment of the three-dimensional shaping device 10 or after replacement of the stage 210. It is assumed that the scratch-forming nozzle 63 is attached to the dispensing unit 60 before starting the execution of the calibration.

In step S10, the control unit 101 controls the stage heater 212 to increase the temperature of the stage 210 to a temperature when the three-dimensional shaped object is shaped. In this way, the calibration can be executed in an environment the same as that of actual three-dimensional shaping.

In step S20, the control unit 101 performs scratch forming of forming a scratch on the scratch-forming target member 214 using the scratch-forming nozzle 63. In the scratch forming, the control unit 101 first determines a first position of the nozzle 61 in the shaping surface 211 in which the nozzle 61 is assumed to be positioned by controlling the position changing unit 230. The first position is, for example, 10 mm in the +X direction and 10 mm in the +Y direction from the origin of the shaping surface 211. The first position is determined as a position at which a scratch can be reliably formed on the scratch-forming target member 214. Subsequently, the control unit 101 controls the position changing unit 230 to move the position of the scratch-forming nozzle 63 in the shaping surface 211 to the first position. Then, the control unit 101 controls the position changing unit 230 to relatively move the scratch-forming nozzle 63 in the −Z direction, thereby forming a scratch on the scratch-forming target member 214. An operation implemented by the scratch forming is referred to as a scratch-forming operation.

In step S30, the control unit 101 performs scratch measurement of measuring a position of the scratch. In the scratch measurement, the control unit 101 controls the detection unit 310 to move the camera 311 onto the shaping surface 211. Then, the camera 311 is controlled to capture an image including the scratch-forming target member 214 and the support block 215. The control unit 101 acquires the image from the camera 311, and measures the position of the scratch by analyzing the image. The position of the measured scratch is referred to as a second position. The second position is a position of the nozzle 61 in the shaping surface 211 changed by the control unit 101 controlling the position changing unit 230. That is, the first position is an assumed position of the nozzle 61 in the shaping surface 211. The second position is an actual position of the nozzle 61 in the shaping surface 211. When the position of the nozzle 61 is not deviated, the second position coincides with the first position.

In step S40, the control unit 101 performs correction value calculation. In the correction value calculation, the control unit 101 calculates a difference between the first position and the second position in the X direction and a difference between the first position and the second position in the Y direction. For example, when coordinates (X, Y) of the first position are (10 mm, 10 mm) and coordinates (X, Y) of the second position are (12 mm, 9 mm), a difference of the nozzle 61 from the reference position in the shaping surface 211, that is, from the origin, is (+2 mm, −1 mm). Then, the control unit 101 calculates a correction value for eliminating the difference as (−2 mm, +1 mm).

The control unit 101 stores the correction value calculated by the calibration described above in a non-volatile manner in a storage device provided in the control unit 101. When the three-dimensional shaping is performed by the shaping unit 102, the control unit 101 corrects, in accordance with the correction value stored in the storage device, a command value representing the coordinates of the nozzle 61, which is commanded from the control unit 101 to the position changing unit 230. In this way, it is possible to perform the three-dimensional shaping while correcting the position of the nozzle 61. The control unit 101 may correct the path information included in the shaping data used for the three-dimensional shaping in accordance with the correction value. In this way, it is also possible to perform the three-dimensional shaping while correcting the position of the nozzle 61.

The three-dimensional shaping device 10 according to the first embodiment described above includes the measurement module 300 for measuring the positional deviation of the nozzle 61. Further, in the present embodiment, the measurement module 300 can measure the difference of the nozzle 61 from the reference position in the shaping surface 211, that is, the positional deviation of the nozzle 61 from the origin of the shaping surface 211, based on the first position of the nozzle 61 in the shaping surface 211 and the second position of the nozzle 61 in the shaping surface 211. The first position is a position in which the nozzle 61 is assumed to be positioned by the control unit 101 controlling the position changing unit 230. The second position is a position changed by the control unit 101 controlling the position changing unit 230.

The measurement module 300 used in the present embodiment includes the detection unit 310 including the camera 311 for detecting the second position. Therefore, the second position, which is the actual position of the nozzle 61, can be easily measured.

In the present embodiment, the three-dimensional shaping is performed by controlling the position changing unit 230 based on a measurement result obtained by using the measurement module 300. Therefore, the three-dimensional shaped object can be shaped by controlling the position changing unit 230 so as to correct the positional deviation of the nozzle 61. As a result, for example, the shaping material can be accurately dispensed to the grooves 224 formed in the shaping surface 211.

The three-dimensional shaping device 10 according to the present embodiment includes the scratch-forming target member 214 installed at the predetermined position on the stage 210. The control unit 101 controls the position changing unit 230 to move the scratch-forming nozzle 63 to the first position and bring the tip of the scratch-forming nozzle 63 into contact with the scratch-forming target member 214, thereby performing the scratch-forming operation of forming the scratch SK for measuring the second position. Therefore, the position of the scratch SK formed on the scratch-forming target member 214 can be measured as the second position which is the actual position of the nozzle 61 corresponding to the first position which is the assumed position of the nozzle 61.

In the present embodiment, the dispensing unit 60 is implemented such that the scratch-forming nozzle 63 having no dispensing port is detachable. Therefore, deterioration of the nozzle 61 due to the scratch-forming operation on the scratch-forming target member 214 can be prevented.

In the present embodiment, the hardness of the scratch-forming nozzle 63 is higher than the hardness of the scratch-forming target member 214. Therefore, deterioration of the scratch-forming nozzle 63 due to the scratch-forming operation can be prevented.

In the present embodiment, in the calibration, the scratch-forming operation is performed after the stage 210 is heated by the stage heater 212. Therefore, the positional deviation of the nozzle 61 can be measured in consideration of thermal expansion of the stage 210 when the three-dimensional shaped object is shaped.

In the first embodiment, the position of the scratch is measured using the camera 311 provided in the detection unit 310. Alternatively, the position of the scratch may be measured by a user using a measurement instrument such as a vernier caliper, and a measured value may be input to the control unit 101 using a predetermined input device.

B. Second Embodiment

Figure 9:
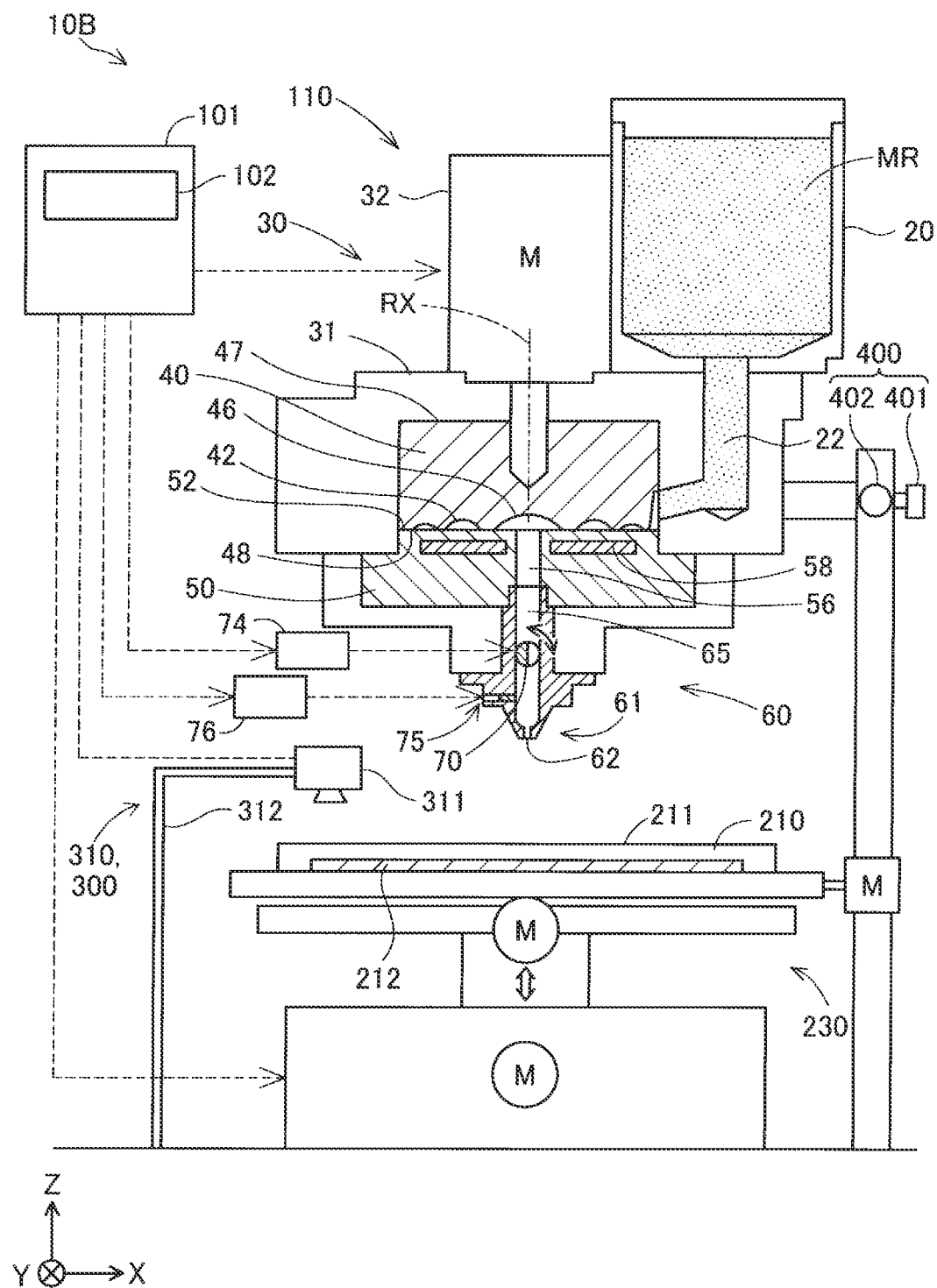
FIG. 9 is an explanatory diagram showing a schematic configuration of a three-dimensional shaping device according to a second embodiment.

FIG. 9 is an explanatory diagram showing a schematic configuration of a three-dimensional shaping device 10B according to a second embodiment. In the first embodiment described above, a correction value for correcting the position of the nozzle 61 is calculated according to a measurement result obtained by using the measurement module 300, and a movement of the nozzle 61 is controlled using the correction value. Alternatively, the three-dimensional shaping device 10B according to the second embodiment includes a correction unit 400 that physically corrects the position of the nozzle 61 based on a measurement result obtained by using the measurement module 300.

As shown in FIG. 9, the correction unit 400 includes a first adjustment screw 401 that moves the dispensing unit 60 including the nozzle 61 in the +X direction or the −X direction, and a second adjustment screw 402 that moves the dispensing unit 60 in the +Y direction or the −Y direction. For example, a user measures a difference between the first position and the second position using the measurement module 300, and physically corrects the position of the nozzle 61 by operating the first adjustment screw 401 and the second adjustment screw 402 so that the difference becomes zero. In this way, a relative position between the nozzle 61 and the stage 210 can be corrected.

In the second embodiment, the correction unit 400 is implemented to physically correct the position of the nozzle 61. Alternatively, the correction unit 400 may be implemented to physically correct an installation position of the position change unit 230.

C. Third Embodiment

Figure 10:
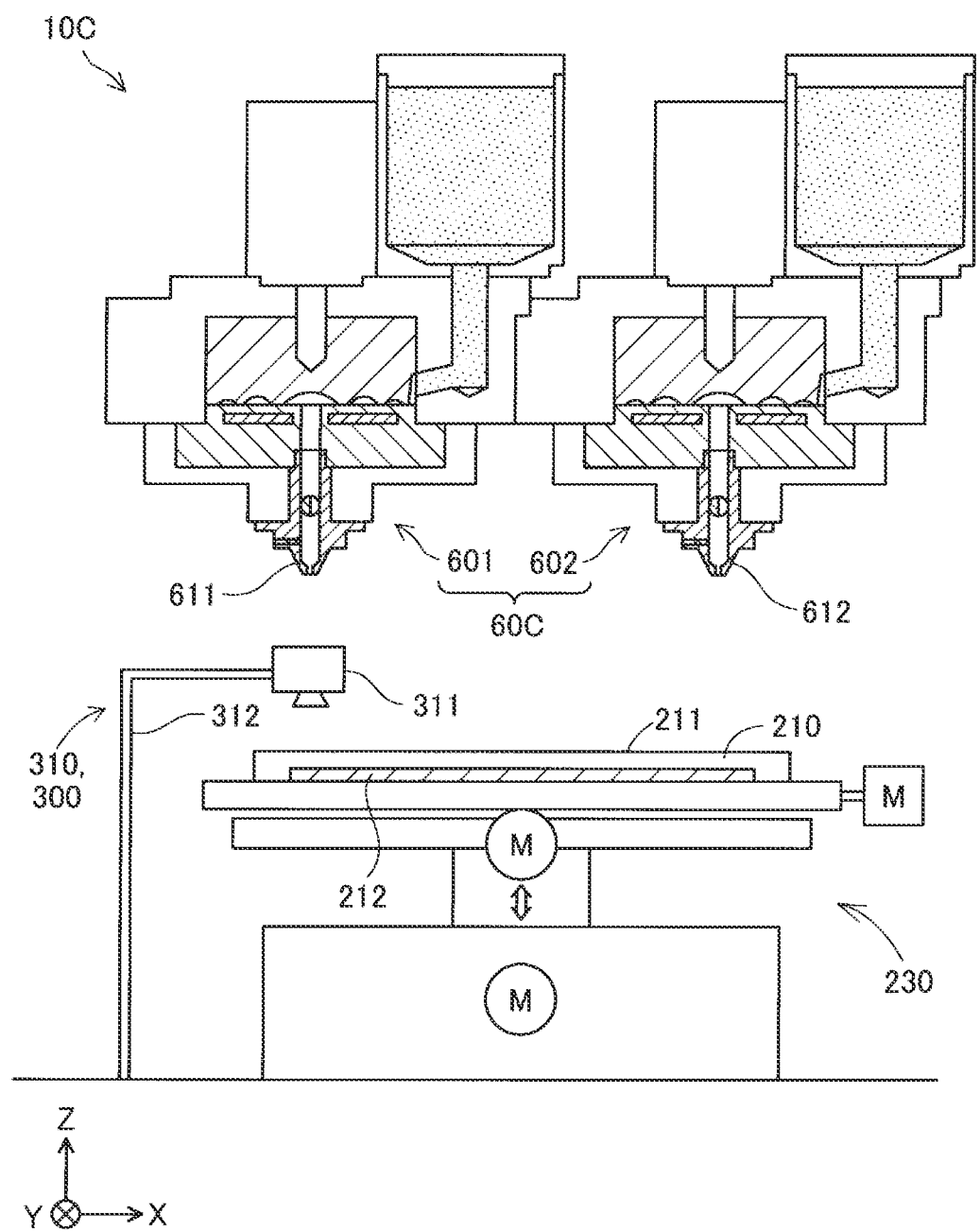
FIG. 10 is an explanatory diagram showing a schematic configuration of a three-dimensional shaping device according to a third embodiment.

FIG. 10 is an explanatory diagram showing a schematic configuration of a three-dimensional shaping device 10C according to a third embodiment. In the first embodiment described above, the dispensing unit 60 includes one nozzle 61. Alternatively, a dispensing unit 60C according to the third embodiment includes two nozzles as three-dimensional shaping nozzles. Specifically, the dispensing unit 60C includes a first dispensing unit 601 and a second dispensing unit 602. The first dispensing unit 601 is provided with a first nozzle 611. The second dispensing unit 602 is provided with a second nozzle 612. For example, different materials are dispensed from the first nozzle 611 and the second nozzle 612. Different materials mean that, for example, when one material is a material for shaping, the other material is a material for support. Other examples of the different materials include materials having different colors and materials having different properties.

In calibration according to the third embodiment, the control unit 101 forms scratches on the scratch-forming target member 214 by using the nozzle provided in each of the dispensing units 60. For example, a scratch is formed at a position of coordinates (10 mm, 10 mm) by the scratch-forming nozzle 63 attached to the first nozzle 611, and a scratch is formed at a position of coordinates (15 mm, 15 mm) by the scratch-forming nozzle 63 attached to the second nozzle 612. Further, the positions of the scratches are respectively measured. For example, when the position of the scratch formed by the scratch-forming nozzle 63 attached to the first nozzle 611 is (10 mm, 10 mm) and the position of the scratch formed by the scratch-forming nozzle 63 attached to the second nozzle 612 is (16 mm, 15 mm), the two nozzles are deviated by 1 mm in the X direction. Therefore, the control unit 101 controls the position changing unit 230 to eliminate the deviation during shaping using the second nozzle 612, so that it is possible to eliminate the positional deviation between the nozzles and perform the three-dimensional shaping. The positional deviation between the nozzles may be eliminated by physically adjusting the position of at least one of the first dispensing unit 601 and the second dispensing unit 602 as in the second embodiment.

Figure 11:
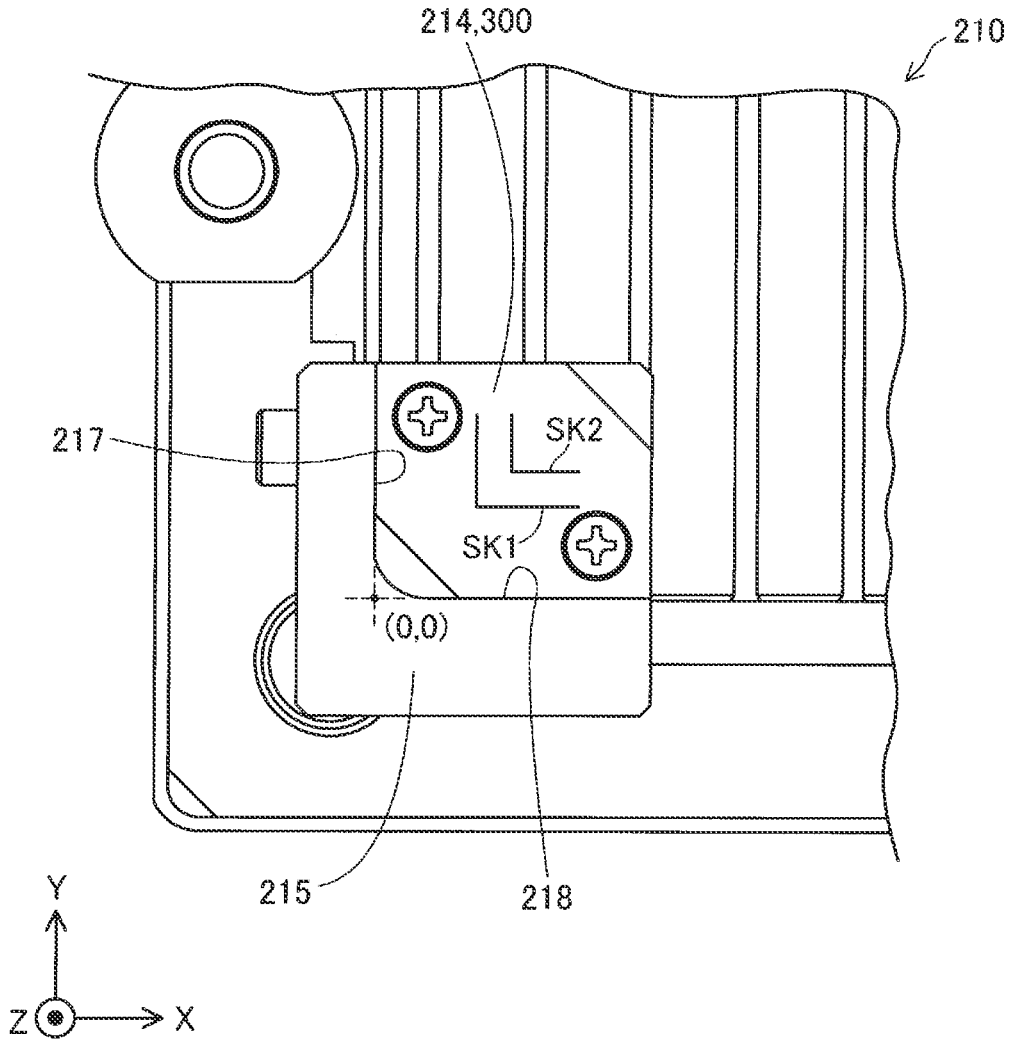
FIG. 11 is a diagram showing another example of scratches formed in the third embodiment.

FIG. 11 is a diagram showing another example of the scratches formed in the third embodiment. In the third embodiment, for example, as shown in FIG. 11, an L-shaped scratch SK1 may be formed by the scratch-forming nozzle 63 attached to the first nozzle 611, and an L-shaped scratch SK2 may be formed at a position away from the scratch SK1 by the scratch-forming nozzle 63 attached to the second nozzle 612. Further, by measuring an interval between the scratches SK1 and SK2 in the X direction and the Y direction, the positional deviation between the nozzles can be measured.

D. Other Embodiments (D1) In the above embodiments, for example, the camera 311 may be arranged to move between the nozzle 61 and the stage 210, and the position of the nozzle 61 may be directly measured without using the scratch-forming target member 214 or the scratch-forming nozzle 63 by capturing an image of the nozzle 61 from below by the camera 311. The position of the nozzle 61 may be measured not only by the camera 311 but also by using various optical sensors such as a shape measurement sensor using a two-dimensional laser.

(D2) In the above embodiments, the scratch is formed on the scratch-forming target member 214 by the scratch-forming nozzle 63, and the position of the scratch is measured as the position of the nozzle 61. Alternatively, for example, the positional deviation of the nozzle 61 may be measured by dispensing the shaping material from the nozzle 61 onto the shaping surface 211 of the stage 210 in a dot shape or a linear shape and measuring the position of the shaping material on the shaping surface 211.

(D3) In the above embodiments, the scratch is formed on the scratch-forming target member 214 by the scratch-forming nozzle 63. Alternatively, the scratch may be formed on the scratch-forming target member 214 by the nozzle 61 used for dispensing. For example, the control unit 101 can form a dent scratch on the scratch-forming target member 214 by relatively moving the nozzle 61 in the −Z direction so as to press the nozzle 61 against the scratch-forming target member 214. When the scratch is formed by the nozzle 61, the hardness of the nozzle 61 is preferably higher than the hardness of the scratch-forming target member 214.

(D4) In the above embodiments, the scratch-forming target member 214 is attached to the stage 210 by the support block 215. However, the support block 215 is not essential. The scratch-forming target member 214 may be directly attached to the stage 210.

(D5) In the above embodiments, the stage heater 212 is provided on the stage 210. However, the stage 210 may not include the stage heater 212. In this case, the heating of the stage 210 in the calibration shown in FIG. 8 is omitted.

(D6) In the above embodiments, the control unit 101 performs the scratch-forming operation after the stage 210 is heated in the calibration. Alternatively, the control unit 101 may perform the scratch-forming operation both before and after the stage 210 is heated in the calibration. The control unit 101 measures the positions of two scratches formed before and after heating using the detection unit 310, and calculates the difference between the positions. In this way, the control unit 101 can measure not only the positional deviation of the nozzle 61 but also a thermal expansion amount of the stage 210 in a plane direction.

E. Other Aspects

The present disclosure is not limited to the above embodiments, and can be implemented with various configurations within a scope not departing from the gist of the present disclosure. For example, technical features of the embodiments corresponding to technical features of the embodiments described below can be appropriately replaced or combined in order to solve a part or all of the above problems or to achieve a part or all of the above effects. Unless described as essential in the present specification, the technical features can be deleted as appropriate.

(1) According to a first aspect of the present disclosure, a three-dimensional shaping device is provided. The three-dimensional shaping device includes: a dispensing unit including a nozzle; a stage having a shaping surface on which a shaping material is to be laminated; a position changing unit configured to change a relative position between the nozzle and the stage; a control unit configured to control the position changing unit; and a measurement module used to measure a difference of the nozzle from a reference position in the shaping surface based on a first position of the nozzle in the shaping surface and a second position of the nozzle in the shaping surface. The first position is a position in which the nozzle is assumed to be positioned by the control unit controlling the position changing unit. The second position is a position changed by the control unit controlling the position changing unit.

With such a configuration, the positional deviation of the nozzle in the shaping surface of the stage can be measured.

(2) In the above aspect, the measurement module may include a detection unit configured to detect the second position. With such a configuration, the second position can be easily measured.

(3) In the above aspects, the control unit may control the position changing unit based on a measurement result obtained by using the measurement module. With such a configuration, the three-dimensional shaped object can be shaped by controlling the position changing unit so as to correct the positional deviation of the nozzle.

(4) In the above aspects, the three-dimensional shaping device may further include: a correction unit configured to correct the relative position between the nozzle and the stage based on a measurement result obtained by using the measurement module. With such a configuration, the position of the nozzle can be corrected based on the measured difference of the nozzle from the reference position.

(5) In the above aspects, the measurement module may include a scratch-forming target member installed at a predetermined position on the stage, and the control unit may be configured to control the position changing unit to relatively move the nozzle to the first position and bring a tip of the nozzle into contact with the scratch-forming target member, thereby performing a scratch-forming operation of forming a scratch for measuring the second position. With such a configuration, the position of the scratch formed on the scratch-forming target member can be measured as the second position.

(6) In the above aspects, the dispensing unit may be implemented such that the nozzle is a detachably attached scratch-forming nozzle having no dispensing port. With such a configuration, deterioration of the nozzle due to the scratch-forming operation on the scratch-forming target member can be prevented.

(7) In the above aspects, a hardness of the scratch-forming nozzle is higher than a hardness of the scratch-forming target member. With such a configuration, deterioration of the scratch-forming nozzle can be prevented.

(8) In the above aspects, the three-dimensional shaping device may further include: a heating unit configured to heat the stage. The control unit may be configured to perform the scratch-forming operation after the stage is heated by the heating unit. With such a configuration, the positional deviation of the nozzle can be measured in consideration of thermal expansion of the stage.

(9) In the above aspect, the control unit may be configured to perform the scratch-forming operation not only after the stage is heated by the heating unit but also before the stage is heated. With such a configuration, a thermal expansion amount of the stage can be easily measured.

(10) In the above aspect, the dispensing unit may include a first dispensing unit and a second dispensing unit, and the control unit may be configured to perform a second measurement operation of bringing a tip of a nozzle provided in the first dispensing unit and a tip of a nozzle provided in the second dispensing unit into contact with the scratch-forming target member. With such a configuration, the positional deviation between the two nozzles can be measured.

(11) According to a second aspect of the present disclosure, a calibration method of a three-dimensional shaping nozzle provided in a three-dimensional shaping device is provided. The three-dimensional shaping device includes a dispensing unit including a nozzle, a stage having a shaping surface on which a shaping material is to be laminated, a position changing unit configured to change a relative position between the nozzle and the stage, and a control unit configured to control the position changing unit. The calibration method includes: measuring a difference of the nozzle from a reference position in the shaping surface based on a first position of the nozzle in the shaping surface and a second position of the nozzle in the shaping surface, the first position being a position in which the nozzle is assumed to be positioned by the control unit controlling the position changing unit, the second position being a position changed by the control unit controlling the position changing unit.

What is claimed is:

1. A three-dimensional shaping device comprising:
   a dispensing unit including a nozzle;
   a stage having a shaping surface on which a shaping material is to be laminated;
   a position changing unit configured to change a relative position between the nozzle and the stage:
   a control unit configured to control the position changing unit; and
   a measurement module used to measure a difference of the nozzle from a reference position in the shaping surface based on a first position of the nozzle in the shaping surface and a second position of the nozzle in the shaping surface, the first position being a position in which the nozzle is assumed to be positioned by the control unit controlling the position changing unit, the second position being a position changed by the control unit controlling the position changing unit,
   the measurement module including a scratch-forming target member that is installed at a predetermined position on the stage, and
   the control unit being configured to control the position changing unit to relatively move the nozzle to the first position and bring a tip of the nozzle into contact with the scratch-forming target member, thereby performing a scratch-forming operation of forming a scratch for measuring the second position.

2. The three-dimensional shaping device according to claim 1, wherein
   the measurement module further includes a detection unit configured to detect the second position.

3. The three-dimensional shaping device according to claim 1, wherein
   the control unit controls the position changing unit based on a measurement result obtained by using the measurement module.

4. The three-dimensional shaping device according to claim 1, further comprising:
   a correction unit configured to correct the relative position between the nozzle and the stage based on a measurement result obtained by using the measurement module.

5. The three-dimensional shaping device according to claim 1, wherein
   the dispensing unit is implemented such that the nozzle is a detachably attached scratch-forming nozzle having no dispensing port.

6. The three-dimensional shaping device according to claim 5, wherein
a hardness of the scratch-forming nozzle is higher than a hardness of the scratch-forming target member.

7. The three-dimensional shaping device according to claim 1, further comprising:
a heating unit configured to heat the stage, wherein
the control unit is configured to perform the scratch-forming operation after the stage is heated by the heating unit.

8. The three-dimensional shaping device according to claim 7, wherein
the control unit is configured to perform the scratch-forming operation not only after the stage is heated by the heating unit but also before the stage is heated.

9. The three-dimensional shaping device according to claim 1, wherein
the dispensing unit includes a first dispensing unit and a second dispensing unit, and
the control unit is configured to bring a tip of a nozzle provided in the first dispensing unit and a tip of a nozzle provided in the second dispensing unit into contact with the scratch-forming target member in the scratch-forming operation.

* * * * *